United States Patent [19]
Lee et al.

[11] Patent Number: 5,937,163
[45] Date of Patent: Aug. 10, 1999

[54] METHOD AND SYSTEM AT A HOST NODE FOR HIERARCHICALLY ORGANIZING THE LINKS VISITED BY A WORLD WIDE WEB BROWSER EXECUTING AT THE HOST NODE

[75] Inventors: James Lee, Hsinchu; Tai-Yuan Wang, Fengshan; Jen-Chieh Cheng, Chang Hua; Yun-Fuh Yeh, Hsinchu, all of Taiwan

[73] Assignee: Industrial Technology Research Institute, Taiwan

[21] Appl. No.: 08/625,515

[22] Filed: Mar. 26, 1996

[51] Int. Cl.$^6$ .............................. G06F 17/30; G06F 13/00
[52] U.S. Cl. .................................. 395/200.48; 395/200.3; 395/200.33; 395/200.47; 395/200.49; 345/356; 345/357; 707/102; 707/514
[58] Field of Search ........................ 395/200.01, 200.02, 395/200.03, 200.09, 200.12, 200.15, 200, 200.33, 200.46–200.49; 345/335, 356–357; 370/400–401, 408; 706/45, 59; 707/100, 102, 500, 513–514

[56] References Cited

U.S. PATENT DOCUMENTS

| | | | |
|---|---|---|---|
| 5,347,295 | 9/1994 | Agulnick | 345/156 |
| 5,384,911 | 1/1995 | Bloomfield | 395/333 |
| 5,430,836 | 7/1995 | Wolf | 395/335 |
| 5,432,903 | 7/1995 | Frid-Nielsen | 395/200.48 |
| 5,471,560 | 11/1995 | Allard et al. | 706/59 |
| 5,530,852 | 6/1996 | Meske, Jr. et al. | 395/200.36 |
| 5,572,643 | 11/1996 | Judson | 395/200.48 |
| 5,583,996 | 12/1996 | Tsuchiya | 395/200.48 |
| 5,608,726 | 3/1997 | Virgile | 370/401 |
| 5,644,740 | 7/1997 | Kiuchi | 345/357 |
| 5,732,078 | 3/1998 | Arango | 370/355 |
| 5,829,003 | 10/1998 | Okura | 707/100 |

OTHER PUBLICATIONS

Lotus Development Corp., "Lotus Organizer Release 2" advertisement, 1996 (http://www.lotus.com/organize/2102.htm).

Jon Zilber, Prime–Time Player, MacUser, Apr. 1986 (http//www.zdnet.com/macuser/mu_0496/feature.html).

Oracle™, "The Network Computer (TM): Intelligent Clients for the Age of Netowkr Computing," Jan. 23, 1996 (http//www/oracle.com/headlines/htm/ncwp.html#The Network Computer).

iBox# Advertisement [No date].

PowerTV#, "The PowerTV White Paper: Open–platform Architecture for Interactive Digital Set–top Boxes," 1996 (http//www.powertv.com/product/complete/white.html).

Twin Bridge Software Corp. Home Page, 1996 (hhtp://www.twinbridge.com).

Quarterdeck Mosaic Advertisement, 1996 (http://www.q-deck.com/qdeck/demosoft.QMosaic).

ViewCall™ Advertisement [No date].

*Primary Examiner*—Parshotam S. Lall
*Assistant Examiner*—Bharat Barot
*Attorney, Agent, or Firm*—Proskauer Rose LLP

[57] ABSTRACT

A host node is provided with an I/O port and a display monitor. The I/O port transmits packets to a specific one of the remotely accessible server nodes containing a request for information. In response, the I/O port receives packets containing requested information, entries describing other topics of information that can be provided from the specific server node and entries describing other server nodes. The display monitor has a view area on which images are displayed. The display monitor displays a hierarchically organized table. The table includes the entries describing remotely accessible server nodes and the entries describing topics of information that can be retrieved from the remotely accessible server nodes. The entries are hierarchically organized so as to indicate a hierarchical organization of the entries as provided for retrieval from the remotely accessible server nodes which hierarchical order of retrieval is independent of a specific order of retrieval by the host node.

12 Claims, 9 Drawing Sheets

FIG. 8

| ICON | 使用中的 ICON | 貫示 (MEANS) |
|---|---|---|
| 131 — ⟨ ⟩ | ◁ ▷ | BACK & FORWARD |
| 145 — ⇨ | ⇨ | GO |
| 141 — (cube) | animation | CONNECTION INDICATION |
| 143 — ● | ● | STOP |
| 161 — | | 貫 (CHAPTER) |
| 171 — G | 永 | 節 (SECTION) GOPHER |
| 172 — N | 永 | 節 (SECTION) NEWS |
| 174 — H | 永 | 節 (SECTION) HTML |
| 127 — | | ACCESSORIES |
| 126 — | | PRINT |
| 121-124 — | | BOOK |
| 125 — | | BLANKBOOK |
| 148 — Contents | Contents | TAB OF CONTENT |
| 147 — | | CORNER |
| 132 — | | CLOSE BUTTON |
| 142 — | | GAUGES |
| 152 — 10.15.1995 | | DATE |
| 151 — ⊕ | | CLOCK |
| 146 — ⇦ | | SCROLL BAR |
| 128 — | | FILING |
| 129 — E中 | | TRANSLATION |

METHOD AND SYSTEM AT A HOST NODE FOR HIERARCHICALLY ORGANIZING THE LINKS VISITED BY A WORLD WIDE WEB BROWSER EXECUTING AT THE HOST NODE

COPYRIGHT NOTICE

A portion of the disclosure of this patent document contains material which is subject to copyright protection. The copyright owner has no objection to the facsimile reproduction by any one of the patent document or patent disclosure as it appears in the United States Patent and Trademark Office file or records, but otherwise reserves all copyright rights whatsoever.

FIELD OF THE INVENTION

The present invention relates to communications networks, such as wide area networks. The communications network includes nodes that are interconnected to a backbone network. Communications is achieved by transmitting a bitstream that is organized into packets between the nodes via the backbone network. The invention particularly pertains to enhancing the graphical user interface of a node which communicates packets so as to facilitate the organization of information retrieved from other nodes via packet communication.

BACKGROUND OF THE INVENTION

FIG. 1 shows a conventional communications network 1. Illustratively, the communications network 1 is the Internet, although the present invention is applicable to other networks. As shown, the communications network includes a wide are network (WAN) W. The WAN W may be formed by the Internet backbone. As shown, connected to the WAN W are multiple subnetworks a, b, c and d. These subnetworks may be stand alone computers, local area networks (LANs) or campus/enterprise networks. (A campus/enterprise networks is a collection of independent LANs at the same geographic campus, or enterprise location, that are commonly connected by a local backbone network.)

The communications network 1 includes multiple nodes, including router nodes or routers, hosts nodes or hosts and server nodes or servers. As shown, the WAN W includes multiple interconnected routers r1, r2, r3, r4, r5, r6, etc. (Illustratively, the router nodes r1–r6 of the WAN W are organized into separate backbone networks and access points as per the Internet backbone model. For sake of brevity, the specifics of the organization of the WAN W are omitted without loss of generality.) The connections may include any combination of wires, coaxial cables, optical fibers, packet and circuit switches, etc. The subnetwork a includes the host h1 connected to the router r1 of the WAN W. The subnetwork b includes the server s1, connected to the router r2 of the WAN W. The subnetwork c includes a router r7, connected to the router r5 of the WAN W, and multiple servers s2, s3 and s4 connected to the router r7 in a LAN configuration. Illustratively, the LAN is an Ethernet LAN, although the LAN could also be a token ring LAN, ATM LAN, etc. The subnetwork d includes a router r8, connected to the router r6 of the WAN W, and a server s5 and hosts h2 and h3 connected to the router r8 in a LAN configuration.

FIG. 2 shows a block diagram of a conventional host, router or server node 10. As shown, the node 10 may include a CPU or processor 11, a memory 12 (i.e., combination of main memory, disk memory, cache memory, etc.) and one or more I/O ports 13-1, 13-2, . . . , 13-N. Also shown are optional devices that are typically present in host nodes including: a graphics controller 14, a display monitor 15 and a manual input device 16. Their purpose is discussed in greater detail below. The devices 11, 12,13-1, . . . , 13-N, 14 and 16 may be interconnected by a bus 17 which transfers data and instructions between the various devices connected thereto. Each I/O port 13-1, . . . , 13-N may be connected by unshielded twisted pairs of wires, coaxial cables, optical fibers, switches, satellite transponders, etc., to one or more I/O ports of another node 10. The I/O ports 13-1, . . . , 13-N are for transmitting and receiving communicated data in the form of a bitstream that is organized into one or more packets (or cells). An exemplary packet 40 is shown in FIG. 3 having a header 42, which contains information for transferring the packet to its destination, and a payload 44 which carries communicated data or a communicated message to be conveyed to the destination. Packets received via the I/O ports 13-1, . . . , 13-N may be temporarily buffered in the memory 12. The processor 11 may process the packets, for instance, to determine to which node the packets should be transmitted (as discussed below). Under control of the processor 11, the packets are transmitted according to an order specified by the processor 11.

A host or server which originates, i.e., initially generates, a packet is called a source node, source host or source server and a host or server which terminates, i.e., ultimately receives, a packet is called a destination node, destination host or destination server. Communications is achieved by transferring a packet via a sequence of nodes including the source node, zero or more intermediary nodes (typically router nodes) and the destination node. This sequence is called a path. The packet is transmitted between each sequential pair of nodes on the path in a bucket brigade fashion. For instance, a packet may be communicated from the source node h1 to the router node r1, to the router node r3, to the router node r5, to the router node r7 and to the server s2.

According to the Internet Protocol (IP), each node of the (Internet) communications network 1 is provided with a unique address. In the above packet transfer, the (processor 11 of the) source node h1 generates a packet 40 and writes in the payload 44 a message to be conveyed to the destination node s2. The (processor 11 of the) source node h1 writes its IP address in a source address field of the packet header 42 and the IP address of the destination node s2 in a destination address of the field of the packet header 42. The host node h1 then transmits the packet to the router r1. (The processor 11 of the source node h1 transfers the packet to an I/O port 13-1 which transmits the packet.) The router r1 receives the packet (i.e., via one of its I/O ports 13-1.) The (processor 11 of the) router r1 uses at least one routing table stored thereat (in it memory 12) to determine the next node (i.e., the node r3) on the path to the destination node s2. The following Table 1 is an example of a routing table at the router r1:

TABLE 1

| Destination Address | Next Node |
|---|---|
| 'h1' | "h1" |
| ... | ... |
| 's2', 's3', 's4' | "r3" |
| ... | ... |

TABLE 1-continued

| Destination Address | Next Node |
|---|---|
| 's5', 'h2', 'h3' | "r3" |
| ... | ... |
| 's1' | "r2" |

In Table 1,'h1', 'h2', 'h3', 's1', 's2', 's3', 's4' and 's5' are IP addresses of the nodes h1, h2, h3, s1, s2, s3, s4 and s5, respectively and "h1", "r2" and "r3" are indications of the nodes h1, r2, and r3, respectively, to which a received packet should be routed. These indications may for instance identify the I/O port 13 or telephone number/address to be used in transmitting the packet to the corresponding next node. The (processor 11 of the) router r1 uses the destination address in the destination address field of the packet header 42 as an index to retrieve a matching routing table entry, wherein a matching routing table entry contains, in its destination address field, the same IP address as the packet's destination IP address. The indicator stored in the next node field of the retrieved matching routing table entry indicates the next node to which the received packet must be transmitted. The (appropriate I/O port 13 of the) node r1 then transmits the packet to the indicated next node, in this case, the node r3. The nodes r3, r5 and r7 perform similar routing table look-ups using the destination address in the packet header in order to determine the next node to which the packet must be transmitted. Eventually the packet arrives at the destination node s2.

Returning to FIG. 2, a host node may also illustratively include a graphics controller 14, a display monitor 15 connected to the graphics controller 14, and a manual input device 16 such as a keyboard or keypad and pointer device (e.g., mouse, joy stick, track ball, track pad, pen stylus, etc.) Illustratively, the processor 11 and graphics controller 14 can execute steps of suitable software so as to enhance the communications capability of a host node. The processor 11, in conjunction with the graphics controller 14, can execute software which provide a graphical user interface that simplifies the communication process. R.O.C. Patent No. 250554 issued to IBM™ and R.O.C. Patent Nos. 237454 and 238450 issued to Microsoft™ Corp. illustrate general graphical user interfaces, but not for use in bidirectional packet communication. U.S. Pat. No. 5,347,295 teaches a pen writing operating system which organizes text and graphical data into books with tabs. The user can advance to a particular data entry or file by selecting an appropriate tab. U.S. Pat. No. 5,432,903 teaches a programming aid with graphical user interface. Specifically, the display of objects is performed using a "hierarchical" display that shows information pertinent to objects, including the functions defined thereon. A "dip" switch like tool bar is provided with different displayable attributes. By selecting different switches, different display filters are activated so as to display only certain attributes of each object at one time. U.S. Pat. No. 5,384,911 teaches a system for converting programs written for command line graphical user interfaces (DOS) to image oriented user interfaces (Windows). This patent provides a graphical user interface. U.S. Pat. No. 5,430,836 teaches a programming platform in which a common graphical user interface programming module is provided. This enables the user to reduce the amount of code that is generated. Lotus™ Corp.'s Organizer™ release 2 also provides an organizer which uses an image of a book in its graphical user interface to organize the information.

A specific use of the communications network 1 is to communicate on the World Wide Web (Web). The Web is used by hosts to search for information at various remote nodes, to retrieve information from remote nodes based on the search, or other criterion, and to display textual and graphical information retrieved from the remotely accessed nodes.

In addition, several products have been announced which combine Web communication with other products such as game consoles, computers, disc players, personal digital assistants, pagers, video telephones, set-top boxes and televisions. See Jon Zilber, Prime-Time Player, MACUSER, April 1996 (http\\www.zdnet.com\macuser\mu_0496\features\feature.html), Oracle™, "The Network Computer (TM): Intelligent Clients for the Age of Network Computing," Jan. 23, 1996 (http\\www.oracle.com\headlines\html\ncwp.html#The Network Computer), iBoX™ advertisement, ViewCall™ advertisement and PowerTV™, "The PowerTV White Paper: Open-Platform Architecture for Interactive Digital Set-Top Boxes," (http\\www.powertv.com\Product\Complete\White.html). An important product is the "WebTV™" or combination of Web access devices with ordinary consumer televisions. Such Web access devices will consist of a modem or network interface (that is typically incorporated into a cable television set-top box), a basic processor capable of performing Internet access and a graphics generator capable of outputting the retrieved information in a format suitable for display on an ordinary consumer television. See the above noted PowerTV reference. Other important Web access devices include the Webputer™ (basic WebTV™ device that can also be expanded into a full computer), Webman™ (personal digital assistant with Web access via a cellular or wireless network) and Webkiosk™ (public use Web access terminal set up similar to an automated teller machine).

A software application executing on a host which enables entry of queries and retrieval/display of information originating at a remote node is called Web "browser" software. A software application executing on a server node which executes queries against a database stored therein, or which retrieves information for transmission to a requesting node is called Web "server" software. A number of companies provide Web Browser and Web server software such as Lycos™, Inc., Open Text™, Inc., Infoseek™ Corp., Architext Software™, America Online™, Inc., Yahoo!™ Corp., TradeWave™ Corp., University of Washington, Netscape™, Mosaic™, and Twinbridge™.

Generally speaking, all Web servers have an acronym or "domain name" for their Internet address which accords with the uniform resource locator (URL) protocol. A central committee called Internic controls the assignment of domain names to Web servers to ensure, among other things, uniqueness of domain names over the Internet. The domain names are nothing more than unique acronyms that can be translated to IP addresses. The user of a Web browser executing on a host node, e.g., the host h1, can enter a request to contact a specific remotely accessible server, e.g., the server s2, by typing in a textual communication command (using the manual input device) according to the URL protocol such as:

http:\\www.domain name.entity type wherein "http" identifies a transport protocol to be used in conjunction with the IP protocol, "www" stands for World Wide Web, "domain name" is the particular domain name specified by the user and "entity type" is either "mil" (military), "edu" (education), "gov" (government), "org" (organization), "net" (network) or "com" (commercial). The textual communication command specified above is often referred to as "a URL". In response, the host h1 executes one of a number of sequences of steps for communicating with the server node corresponding to the domain name. If the host h1 has available in the memory 12 a translation of the domain name to its corresponding IP address, the host h1 can communicate its packets directly with the server node to be contacted. The processor 11 of the host h1 translates the domain name to the IP address of the to-be-contacted server node. The processor 11 generates a packet and writes the IP address of the to-be-contacted server node in the destination address field. The host h1 then writes a message that requests to log on to the to-be-contacted server node, which message accords with the URL protocol.

Alternatively, if the host h1 does not have translation information available, the processor h1 may generate a packet and write in the destination address field of the packet the IP address of the host's h1 domain name server. The domain name server is typically a server maintained by the Internet access provider (a network subsumed within the communications network 1, including at least one router of the WAN W, such as the router r1, that connects the host h1 to the WAN W) for the host h1. (The IP address of the domain name server is preliminarily known to the host h1.) The host h1 then writes a request to retrieve the domain name to IP address translation of the to-be-contact server node. The I/O port 13-1 of the host h1 transmits the packet to its domain name server, e.g., the server s1. When the server s1 receives the packet from the host, the processor 11 of the server s1 consults a domain name to IP address translation table (stored in the memory 12). The server s1 transmits back to the host h1 the domain name to IP address translation of the to-be-contact server s2 in a packet. The host h1 receives the translation and can then generate a packet for direct transmission to the server s2.

The packet containing the request to log onto the server s2 propagates on a path in the above described fashion and arrives at the server s2. In accordance with the Web server software executing on the server s2, the processor 11 of the server s2 generates one or more message packets for return transmission to the host h1. Illustratively, the message packets include textual/graphical document information that is formatted according to the hypertext markup language or "HTML" format. The HTML format provides a universal, display monitor independent manner of describing the information so that the specifics regarding how to size/fit the text and images, etc. can be selected by each individual host depending on its display capabilities.

Illustratively, the host h1 receives the information bearing packets from the server s2. The processor 11 of the host h1 retrieves the information and interprets the HTML format thereof. Then, the graphics controller 14 displays the information on the display monitor 15 in an appropriate fashion.

Many HTML documents contain "hypertext." Hypertext is selectable text (of the information provided by the Web server s2) describing an information topic for which the Web server s2 stores additional information or for which the Web server s2 can provide the URL of another server that stores information on the topic. Typically, selectable hypertext is so indicated in a highlighted fashion within the body of information displayed on the display monitor screen so as to cue the user that the text corresponds to a hypertext. Illustratively, the user can select/activate a hypertext using a pointer device of the manual input device. In response to selecting a hypertext, the Web server software causes the processor 11 of the host h1 to execute a script (contained in HTML format in the information retrieved from the response packets initially returned from the Web server s2) that corresponds to the hypertext. Typically, the script causes the host h1 to either log onto another server node, or to transmit a command to the same node onto which the host is currently logged for purposes of retrieving the information corresponding to the text of the hypertext. (Herein, when a host node user selects a hypertext that causes the execution of a script, including transmission of one or more packets containing a command for accessing information at that same server node onto which the user is currently logged, the user is said to "execute" an HTML link. On the other hand, when the host node user enters a URL or selects a hypertext that causes a packet to be transmitted to a server node containing a request to log on to the server node, the user is said to "execute" a URL.) If execution of the hypertext results in execution of a URL, the host h1 logs off the current server node and executes the above-noted steps for logging onto the server node indicated by the script (as specified in the script associated with the hypertext). If execution of a hypertext results in execution of an HTML link, the host h1 writes the IP address of the same server node in the packet and one or more information retrieval commands, as specified in the script associate with the hypertext. The host h1 then transmits the packet bearing the command for retrieving the information associated with the hypertext. This packet propagates on a path to the specified server as described above. For example, suppose the selected hypertext executes an HTML link resulting in transmission of a packet to the same server s2 containing a command for retrieving information therefrom. The server s2 receives the packet and the Web server software executing thereon responds (causes the processor 11 of the Web server s2 to respond) to the packet by retrieving the corresponding information. The processor 11 of the Web server s2 generates a packet, writes this information (also in the HTML format) in the payload of a packet and the IP address of the host h1 in the header of the packet. The (I/O port 13-1 of the) Web server s2 then transmits the packet to the host h1. The packet propagates on a path to the host h1 as described above. The Web browser software executing on the host h1 retrieves (causes the processor 11 to retrieve) the information in the packet and display the information on the display monitor 15.

Note that when the host h1 initially executes a URL, thereby logging onto a server node, the server node typically transfers general information (sometimes called a "home page") which specifies sub-topics on which the server can provided additional information using HTML links. When an HTML link is executed by a host node, the server may provided additional information which itself includes additional HTML links for retrieving even more specific or related information from the server. In short, HTML links can be "nested" in a hierarchical fashion which typically progresses from more general information to more specific information provided by the server.

It is possible that the user does not know ahead of time the domain name of the Web server with which it wishes to communicate. Rather, the user may simply know a desired topic of information. Illustratively, the host h1 can contact a server, such as the server s1, which maintains a searchable index of domain names. Associated with each domain name are a number of key words or topics pertaining to information that can be retrieved from the Web server associated with the domain name. Using the manual input device, the user can enter search terms and execute a search. The Web browser responds (cause the processor 11 to respond) by transmitting a query packet to the server s1 with the search terms. In response to such a packet, the (processor 11 of the)

server s1 searches the index and retrieves one or more domain names for which the index contains key words and topics that match the search terms specified in the received packet. The server s1 illustratively generates a packet and writes, in the destination address field of the packet header, the IP address of the host h1, and in the packet payload, the retrieved domain names. The server s1 then transmits the packet to the host h1. In response to receiving the packet, the Web server software causes the processor 11 and graphics controller 14 to display the retrieved domain names on the display monitor 15 for selection by the user. Each server s1 that can perform index searching in this fashion is referred to as a "gopher" server.

In addition to the above mentioned log on and searching capabilities noted above, URL also supports a file transfer protocol, called FTP, for transferring files, and a news group subscription protocol (e.g., Internet Group Management Protocol or IGMP). Both of these protocols are well known and are not reviewed herein. See U.S. Pat. No. 5,353,283; S. Deering, *Multicast Routing in Internet Networks and Extended LANs*, SIGCOMM, p.55 Aug. 16, 1988. Suffice it to say that news groups are multicast routing groups to which a host, e.g., the host h1, can subscribe. After subscribing to a news group, all messages transmitted by the host h1 to that specific news group are distributed to all member nodes of the news group in a multicast routing fashion. Likewise, the host h1 receives messages transmitted from other member nodes to the news group. As with domain names, each news group is provided with an identifying acronym. The user may, or may not, be familiar with the name of a news group with which he or she wishes to subscribe. The names of such news groups may be maintained at a gopher server in a keyword/topic searchable fashion.

FIG. 4 shows an image displayed on a display screen of a typical browser such as Netscape™ Navigator™. A window 31 is provided in which information retrieved from a Web server may be displayed. Different selectable control button icons 33 are provided over the window 31 for initiating communication with a remote Web server or stopping communication with a Web server. Above the icons 33 is a title bar 35 with selectable drop-down menus.

A user looking for an unknown Web server that provides a certain topic of information, or an unknown gopher server or news group pertinent to a particular topic, typically proceeds as follows. The user conducts a search using the gopher server and selected key words. This results in retrieving domain names of potential Web servers, news groups, gopher servers, etc. that contain the information in which the user is interested. The URLs of such retrieved domain names may be displayed in list form on a display screen of the display monitor 15 for selection by the user. The user then attempts to log on or subscribe to selected ones of the servers or news groups retrieved during the search. In the course of logging onto a server, the user may continue to search by executing hypertexts in an effort to obtain the information of interest. As noted above, such hypertext executions may identify more HTML links, URLs, Web server and gopher server domain names, news groups, etc.

Consider that the user may log on to many servers and execute many URLs and HTML links in the course of performing any one search. In the course of performing a search, or at a later time, a user may wish to re-log on and/or re-execute selected URLs or HTML links. Many conventional Web browsers provide a historical listing of the URLs and HTML links used by the user during a session. The user can display the historical list, scroll through the list to the desired location and select the appropriate URL or HTML link. The Web browser responds by transmitting appropriate message packets to corresponding Web servers to re-obtain the information in which the user is interested. However, such historical URL and HTML link lists are not saved between sessions. Some Web browsers provide the user the ability to record favorite URLs and HTML links (and their corresponding IP addresses and accessing messages) for use in subsequent sessions. Other Web browsers record retrieved information. However, the recording of information is in a strict sequential order in which it was retrieved.

There are a number of problems associated with the conventional browsers. First, the historical record of URLs and HTML links is a sequential, flat list in the strict order of use by the user (including duplications of URLs and HTML links, if such URLs and HTML links are used multiple times during a session). Since the user may often re-use URLs and HTML links in a single session, the list can quickly loose any sense of ordering or hierarchy of search as to the mutual inter-relationship of different URLs and HTML links of the list. Simply stated, most servers organize their HTML links in a hierarchical fashion from more general topics to more specific topics. However, the user might not execute the HTML links in this hierarchical order but rather may skip around, especially if the user searches for information on more than one unrelated topic. Second, although favorite URLs and HTML links can be recorded by the user, the graphical user interface typically requires that the user execute multiple "point-and-click" steps using the pointer device in order to re-establish communications with such a favorite or frequently accessed node. For instance, the user may have to click on a "favorite places" icon to first display the favorite places. The user must then search through the listed favorite places to select the appropriate URL or HTML link. No mechanism is provided for displaying icons of multiple favorite places in a selectable fashion so as to enable easy one-step retrieval of information corresponding to such favorite URLs/HTML links. Third, neither the favorite nor historical recording of utilized URLs/HTML links indicates whether the URL or HTML entries are URL, HTML link, gopher index, news group, etc. Fourth, no index ordering is provided to the user for reviewing the retrieved information. Rather the user must scroll thorough the information which is displayed in the same order in which it was retrieved.

It is an object of the present invention to overcome the disadvantages of the prior art.

SUMMARY OF THE INVENTION

This and other objects are achieved by the present invention. An illustrative environment of use of the present invention is a communications network, such as the Internet, wherein remotely accessible server nodes are connected to at least one host node via a backbone network. Communication is achieved between the host node and a server node by transmitting a bitstream, organized into packets, via the backbone network.

According to one embodiment, a host node is provided with an I/O port and a display monitor. The I/O port transmits packets to a specific one of the remotely accessible server nodes containing a request for information. In response, the I/O port receives packets containing requested information, entries describing other topics of information that can be provided from the specific server node and entries describing other server nodes. The display monitor has a view area on which images are displayed. The display monitor displays a hierarchically organized table. The table includes the entries describing remotely accessible server nodes and the entries describing topics of information that can be retrieved from the remotely accessible server nodes. The entries are hierarchically organized so as to indicate a hierarchical organization of the entries as provided for retrieval from the remotely accessible server nodes which hierarchical order of retrieval is independent of a specific order of retrieval by the host node.

For instance, consider the organization of information as it is retrieved from an illustrative server node. When the host node first logs on to the server node by executing a URL indicating and corresponding to the server node, the server node transmits (in packets) so-called "home page" information of a general nature describing different kinds of topics of information that can be retrieved from the server node. The topics are provided as additional URLs and HTML links (indicating a subtopic of information that can be retrieved from a given server node), i.e., hypertexts, wherein the display monitor displays such hypertexts in a fashion indicating that they are selectable. When the user selects a hypertext that indicates one of these topics, e.g., an HTML link, a set of instructions of an HTML script associated with the selected hypertext is executed resulting in the transmission of a packet containing a request for the information corresponding to the selected topic. The server which receives this packet transmits at least one packet back to the host node which contains the retrieved information corresponding to the selected topic. This newly retrieved information can also include selectable HTML links corresponding to related or subtopics of information.

This manner of presentation of information for retrieval from the server node defines a hierarchy of organization from the most general to the most specific. For example, the URL of the server node would be at the highest level of the hierarchy. The URLs and HTML links on the home page would be at the next level of the hierarchy. If one of the HTML links on the home page were executed, then the URLs and HTML links in the information retrieved by such execution, would be on the next level of the hierarchy, etc. The display monitor displays a hierarchical table of entries indicating a history of executed URLs and HTML links which reflects the hierarchical organization as provided by the server nodes. For instance, the display monitor illustratively may display an executed URL. The display monitor illustratively may display one table entry for each URL and HTML link retrieved with the home page of the server corresponding to the executed URL immediately below the entry for the URL. The entries for the retrieved URLs and HTML links on the home page are illustratively indented one tab stop to indicate that they are on a lower level of the hierarchy than the URL. If one of these home page HTML links is executed, the display monitor illustratively may display a list of entries of the URLs and HTML links in the retrieved information immediately below the entry corresponding to the executed HTML link. This second list of entries may be indented two tab stops to indicate that such HTML links are on a level of the hierarchy below the executed HTML link.

Illustratively, the display monitor displays such information using an image, and organization, of a book with multiple indexing tab images. Each image of an indexing tab may be user defined. Each tab is associated with HTML formatted information retrieved from a remotely accessible server node which information is historically maintained. One tab, designated the table of contents, includes the entire hierarchical tabular listing of URLs and HTML links organized into chapters (highest level of the hierarchy) and sections (lower levels of the hierarchy). The user may scroll through the entire table of entries in the table of contents. Using a pointing device, the user may advance to the information retrieved by executing the respective URL or HTML link by selecting the displayed entry therefor in the table of contents or by selecting an image of an indexing tab with the pointing device. The hierarchical organization therefore also provides an index to the retrieved information.

In short, a host node is provided which facilitates communication with remotely accessible server nodes. In particular, the host node maintains an organized history of remotely accessible access servers and topics of information that can be retrieved therefrom, that is organized in a parallel hierarchical fashion as the retrieval of information from such remotely accessible servers. Thus, the user can more easily determine his or her choices of topics of retrieved information thereby facilitating a search for desired information.

BRIEF DESCRIPTION OF THE DRAWING

FIG. 8 illustrates icons displayed on the display monitor according to the present invention.

DETAILED DESCRIPTION OF THE INVENTION

For sake of clarity, the description of the invention is divided into sections.

HARDWARE

Figure 1:
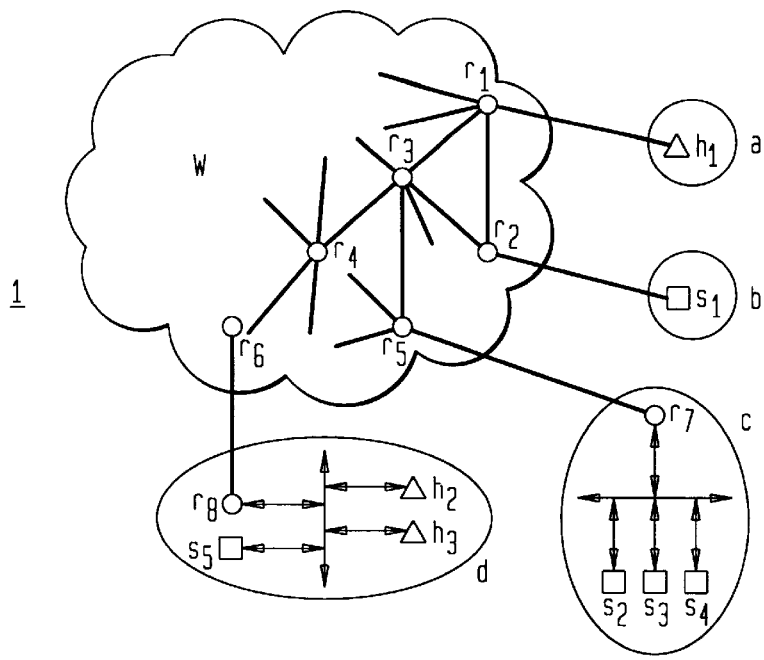
FIG. 1 shows a conventional communications network.
Figure 2:
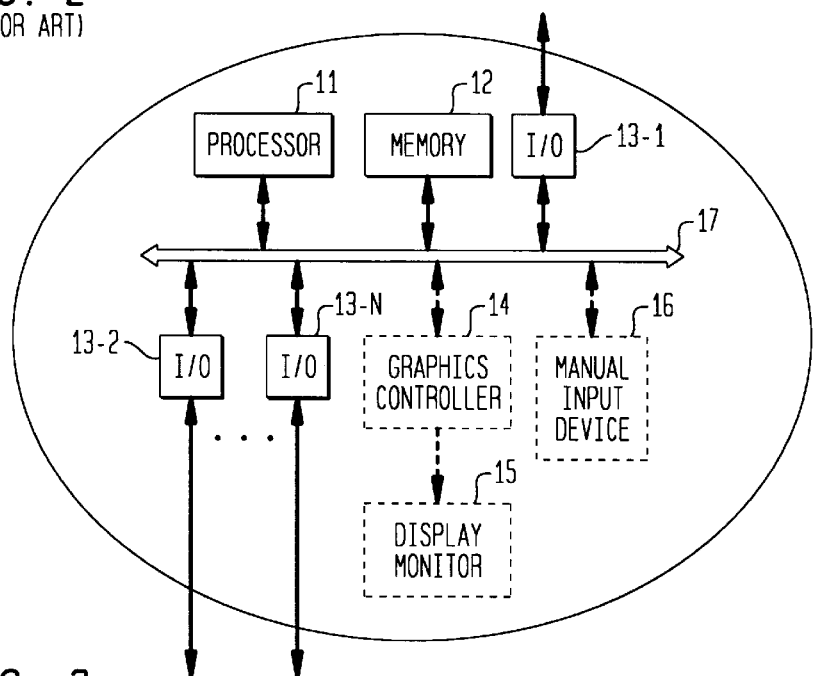
FIG. 2 shows a conventional node.
Figure 3:
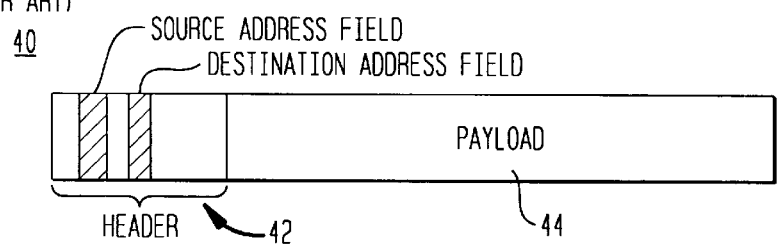
FIG. 3 shows a conventional packet.
Figure 4:
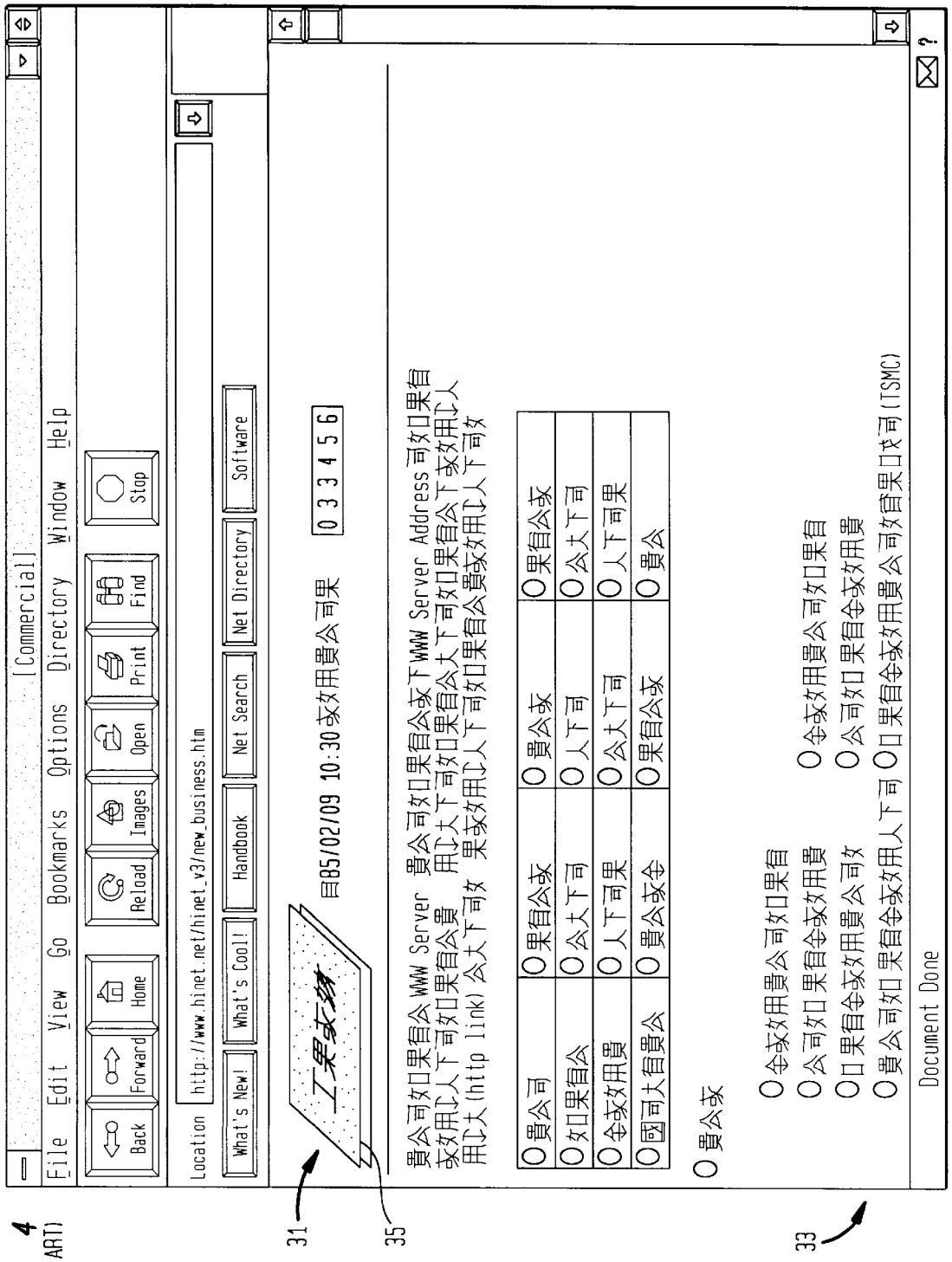
FIG. 4 shows an image displayed on a display monitor using a conventional Web browser.
Figure 5:
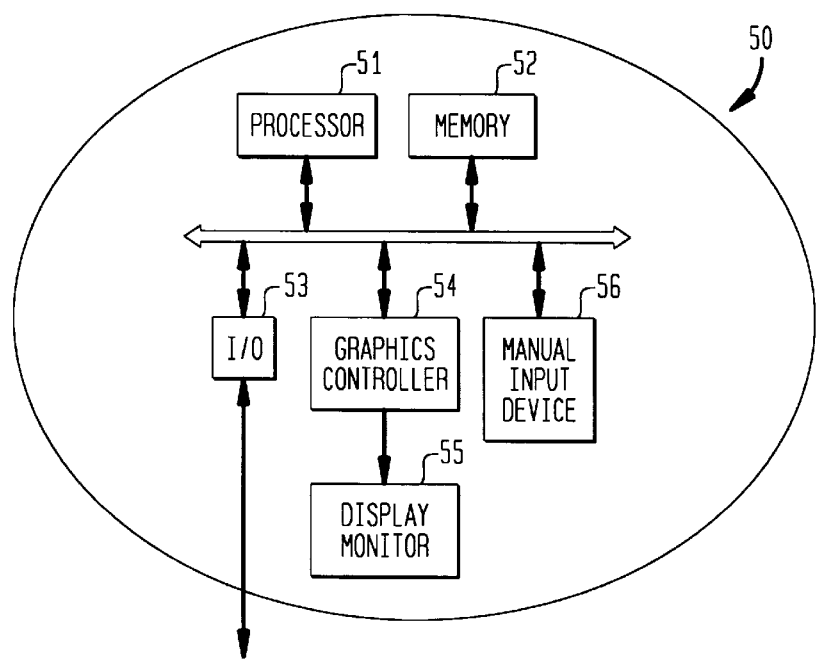
FIG. 5 shows a host node according to an embodiment of the present invention.

A host node 50 according to an embodiment of the present invention is depicted in FIG. 5. Like the node 10 of FIG. 2, the node 50 has a processor 51, a memory 52, at least one I/O port 53, a graphics controller 54, a display monitor 55 and a manual input device 56. The processor 51, memory 52, I/O port 53, graphics controller 54 and manual input device 56 are all connected to a systems bus 57 which transfers data and instructions between the various devices. The processor 51 may be a microprocessor such as Intel™'s Pentium™ processor or Motorola™'s PowerPC 603e™ or 604™. The memory 52 may include a hard disk drive, floppy disk drive, CD, SRAM and DRAM memory, etc. The I/O port 53 may be a modem, Ethernet interface, etc. and may include a cellular telephone, analog telephone line or leased digital line. The graphics controller 54 may be any suitable graphics controller such as Diamond™'s Stealth™. The display monitor 55 may be a liquid crystal display or cathode ray tube. The manual input device 56 may include a keyboard, pointer device (such as a mouse or trackball) or a pen stylus. The bus 57 may be a PCI bus, ISA bus, EISA bus, Nubus or any other type of bus.

The "host node" 50 may be in the form of a set top box, in which case the display monitor 55 is an ordinary consumer television on which video can optionally be displayed. The I/O device 53 would include an interface for connecting to the cable television network which delivers both video and other communication services to the set top box. Alternatively, the "host node" may form part of a game console or expandable computer. The I/O device 53 may be part of the cable television network as above or a modem that connects to a telephone network. Alternatively, the host node 50 may be part of a personal digital assistant in which case the I/O device 53 illustratively includes a cellular or cordless telephone transceiver. The host node may alternatively be incorporated into a public access terminal, such as at a kiosk or combined with consumer electronic devices such as a digital versatile disk or CD-ROM.

COMMUNICATIONS/USER INTERFACE OVERVIEW

The processor 51 and graphics controller 54 execute software for enabling packet communication with remotely accessible servers via the I/O port 53. In the case of Web communication, the processor 51 is capable of generating packets for requesting information, subscribing to news groups, querying gopher indexes and executing HTML links as per the URL protocol. Such generated packets include the appropriate IP address of the server which is to receive the packet. The I/O port 53 transmits such packets via a WAN similar to the WAN W. The packets propagate from node to node on the WAN and are delivered to the appropriate server. The server generates one or more packets in response, and transmits them via the WAN to the I/O port 53 of the host 50. The processor 51 and graphics controller 54 are capable of extracting HTML formatted information from packets received from remote servers, interpreting such information, and displaying the information on the display monitor 55 in a coherent fashion.

DISPLAY PORTION OF THE GRAPHICAL USER INTERFACE

Figure 6:
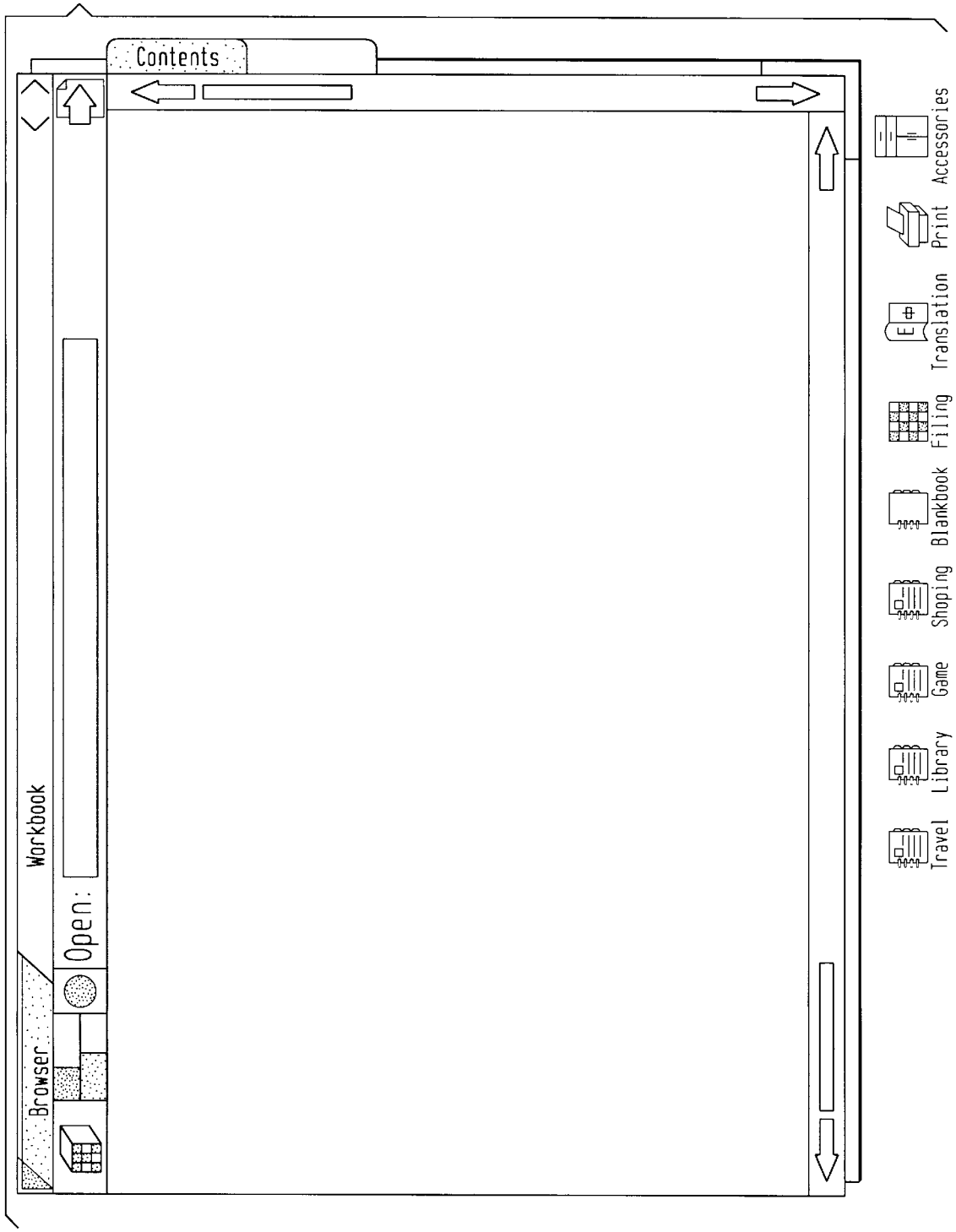
FIGS. 6 and 7 show an image displayed on a display monitor of a host node according to the present invention.
Figure 7:
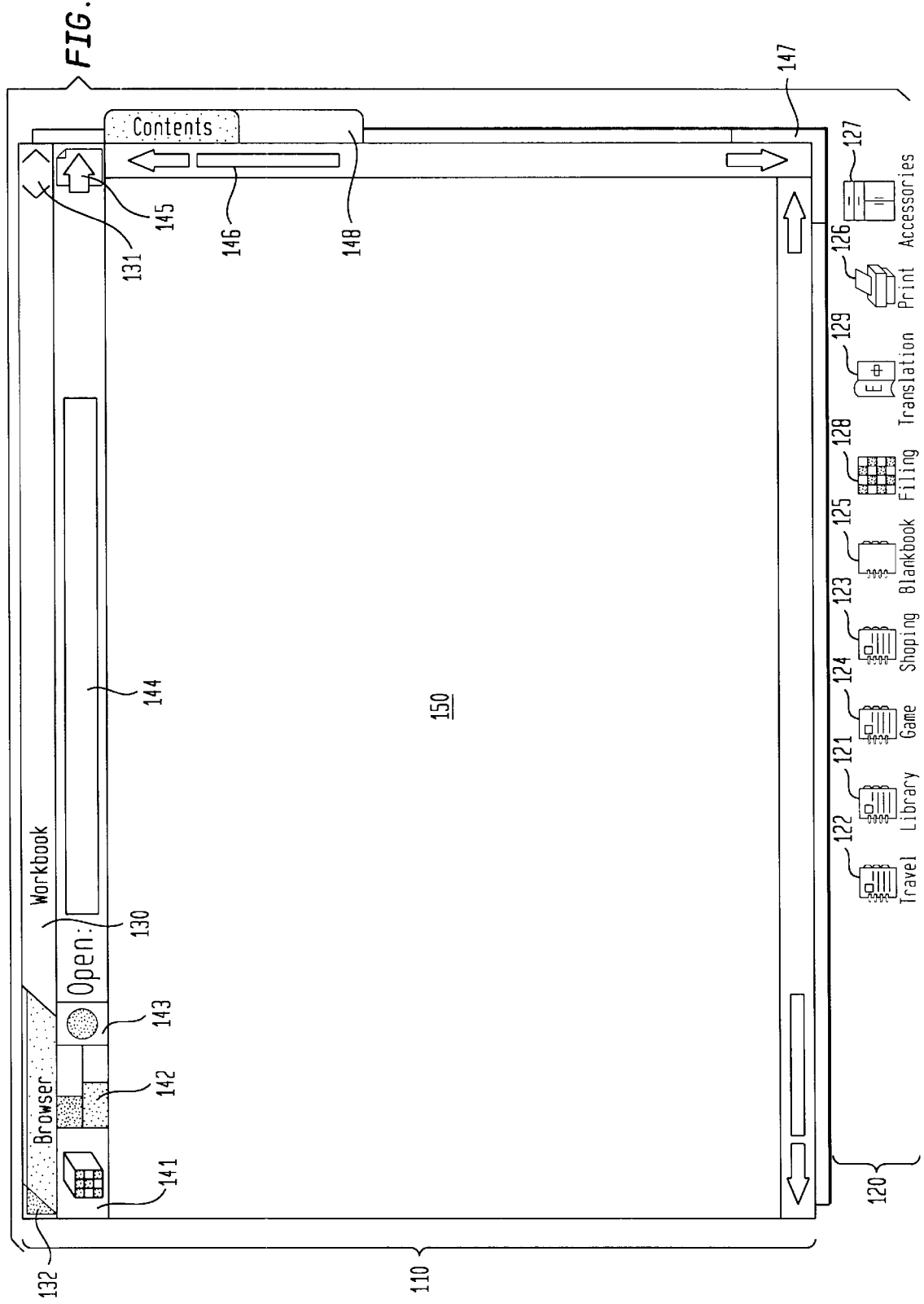

FIGS. 6 and 7 illustrate an image 100 displayed on the display screen of the display monitor 55 according to an embodiment of the present invention. FIG. 6 shows an actually displayed image 100 whereas FIG. 7 shows the displayed image 100 of FIG. 6 with descriptive legends (that are not displayed) that are provided for sake of explanation herein.

Figure 11:
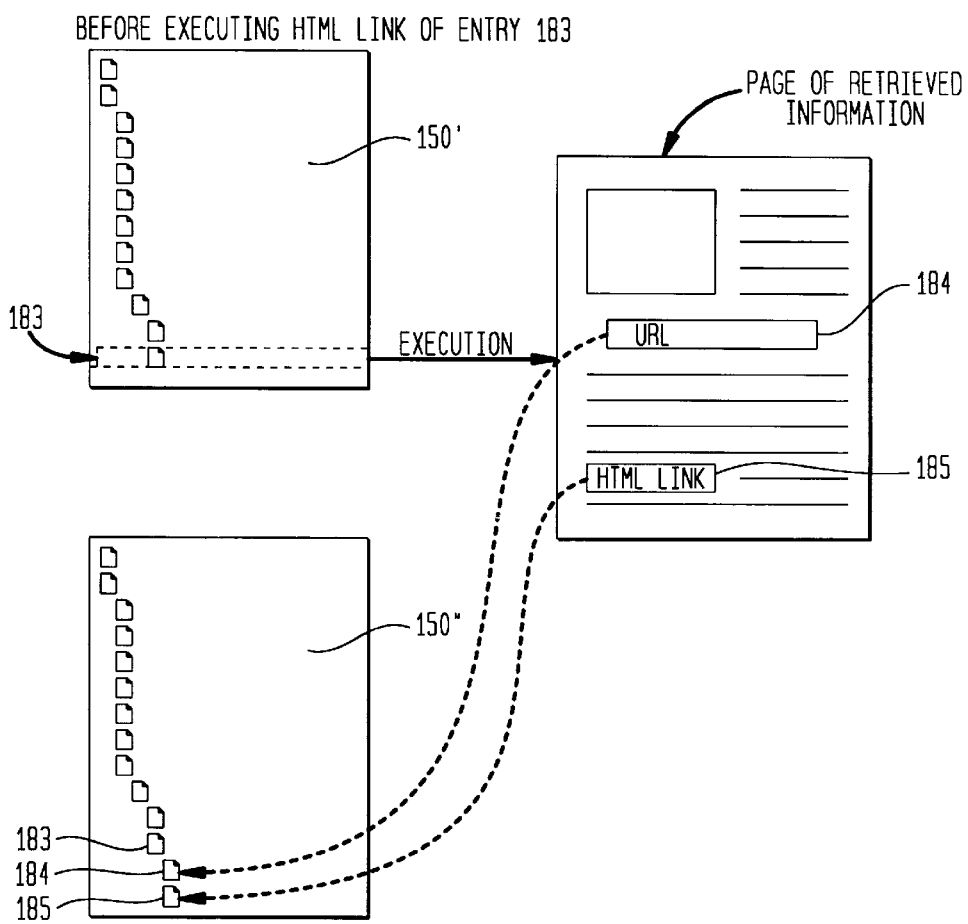
FIG. 11 illustrates an automated hierarchical organization recording of URL and HTML link entries according to the present invention.

As shown, the image 100 includes a sub-image of a book 110 and a row of icons 120 referred to as a bookshelf. A summary of icons and buttons displayed on the display screen 100 (as shown in FIGS. 6,7 and 11) are shown in FIG. 8. The bookshelf 120 includes a number of smaller book icons 121–125, labeled library 121, travel 122, shopping 123, games 124 and blank book 125. The bookshelf 120 also includes a printer icon 126, an accessories icon 127, a filing icon 128 and a translation icon 129. Each book icon 121–125 corresponds to a distinct organization of URLs and HTML links for different topics of interest. When a book icon 121–125 is selected, a book image 110 is displayed, in which the URLs and HTMLs recorded for that topic are displayed, as described below. (Herein, selecting an icon means, using a pointer device of the manual input device 56, positioning the pointer cursor over the icon and, "clicking on", i.e., pressing a select button of the pointer device one or more times. Alternatively, an icon may be selected by contacting a point of a pen stylus to a portion of a display screen on which the to-be-selected icon is displayed and then removing the point from contact with the display screen.) The blank book 125 is an icon for which no URLs or HTML links have yet been stored. The printer icon 126, when selected by the user, causes a printer attached to the host 50 to print information indicated by the user, such as a portion of the information displayed on the display monitor 55. The accessories icon 127, when selected, causes the display monitor 55 to display a window of other icons corresponding to other miscellaneous applications and tools that can be activated/used by selecting the respective icon. The filing icon 128 may be selected to control into which one of multiple URL/HTML link organizations (each URL/HTML link organization is associated with one of the book icons 121–125) retrieved information is to be associated and organized. The translation icon 129 may be selected for translating retrieved information from one language to another, e.g., from Chinese to English.

When the Web server software of the host 50 is initially executed, a special URL/HTML link organization, called the "Work book," is initially used by the processor 51. When any URL/HTML link organization is activated, an image of a book 110 is displayed. The title of the particular URL/HTML link organization, in this case, "Work book" is displayed in a titled bar 130 portion of the book image 110. The Work book is a pre-loaded URL/HTML link organization that contains certain gopher server URLs, news group URLs and other general search URLs. As the user progresses through the communication session, activated URLs and received/activated URLs and HTML links are recorded in the Work book in a hierarchical fashion as described below. Such recorded URLs and HTML links may be selectively copied to other URL/HTML link organizations. When a session is completed, the non-pre-loaded Work book URLs and HTML links retrieved during the session are erased. This provides the user the ability to perform arbitrary searches and then to later save desired information into an existing URL/HTML link organization (represented by the library 121, travel 122, shopping 123 or game icons 124) or a blank URL/HTML link organization (represented by the blank book icon 125).

Figure 10:
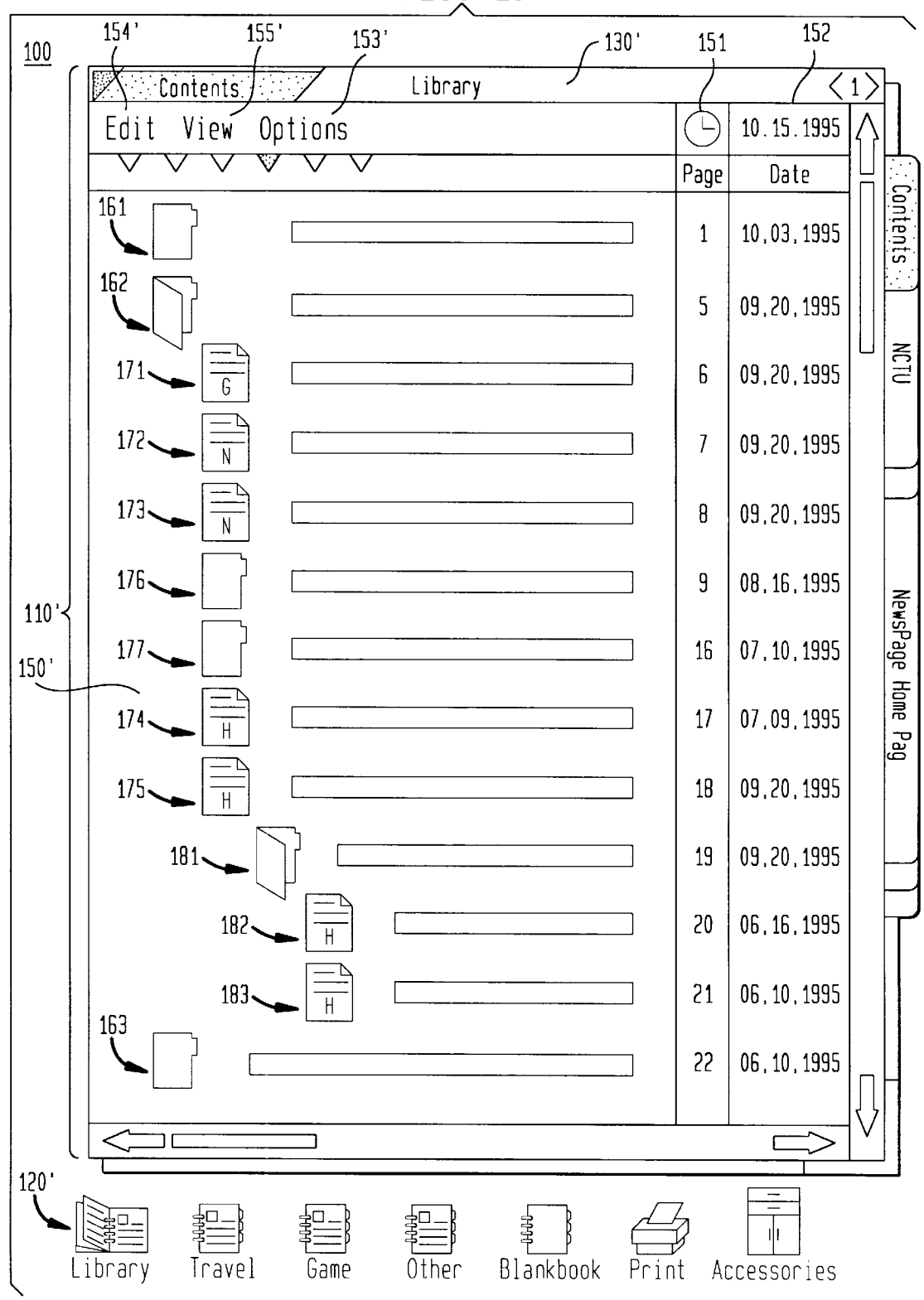
FIG. 10 shows a hierarchical organization according to the present invention.

Continuing with the explanation of the image 100, adjacent to the title section 130 of the title bar are backward and forward button images 131 and a close button image 132. The backward and forward button images 131 are used to scroll through the information shown in the display area section 150 of the book image. Each full area 150 of information is considered a page. The backward and forward button images 131, when selected by the pointer device of the manual input device 56, causes the display monitor 55 to display the previous or next page, e.g., of hierarchically organized URL/HTML link information or retrieved documentary information, in the display area 150. The pages are sequentially numbered and the number of the currently display page is displayed in between the backward and forward button images 131 (as shown in FIG. 10). The close button 132, when selected, causes the processor 151 and graphics controller 154 to terminate execution of the Web browser software.

Below the title bar are a number of button/indicator images 141–145. The connection indication 141 displays an animated image when communication with a remotely accessible server node is in progress. The gauges 142 graphically illustrate the percentage of information to be retrieved that has in fact been received at the host 50. Typically, when executing a URL or HTML link, the server node, in the course of transmitting the packets containing requested information, will also transmit indications of how much of the information has so far been transferred. The processor 51 and graphics controller 54 update the displayed gauge graphic 142 to reflect the indications received from the server. The stop button image 143 may be selected by the user to terminate communication with a server. In response, the I/O port 53 ceases to receive packets from the server, including, possibly taking steps to terminate the current communications connection with the server (hanging up the phone, etc.) The input URL area 144 may be selected for keystroke entry of a URL. After the user types in the URL of the server with which the user wishes to communicate, the user selects the go button image 145 to cause the processor 51 and I/O port 53 to execute the URL entered in the area 144 (i.e., cause the I/O port 53 to transmit appropriate packets requesting the URL to IP address translation, if not available, and requesting to log onto the server corresponding to the URL entered in the area 144).

Vertical and horizontal scroll bars 146 are provided for enabling the user to vertically and horizontally scroll through the information displayed in the display area 150. A zoom corner 147 is also provided for adjusting the size of the display area 150. Finally, user selectable images of indexing tabs 148 are provided. Their purpose is described in greater detail below.

BASIC INFORMATION RETRIEVAL OPERATION

Figure 9:
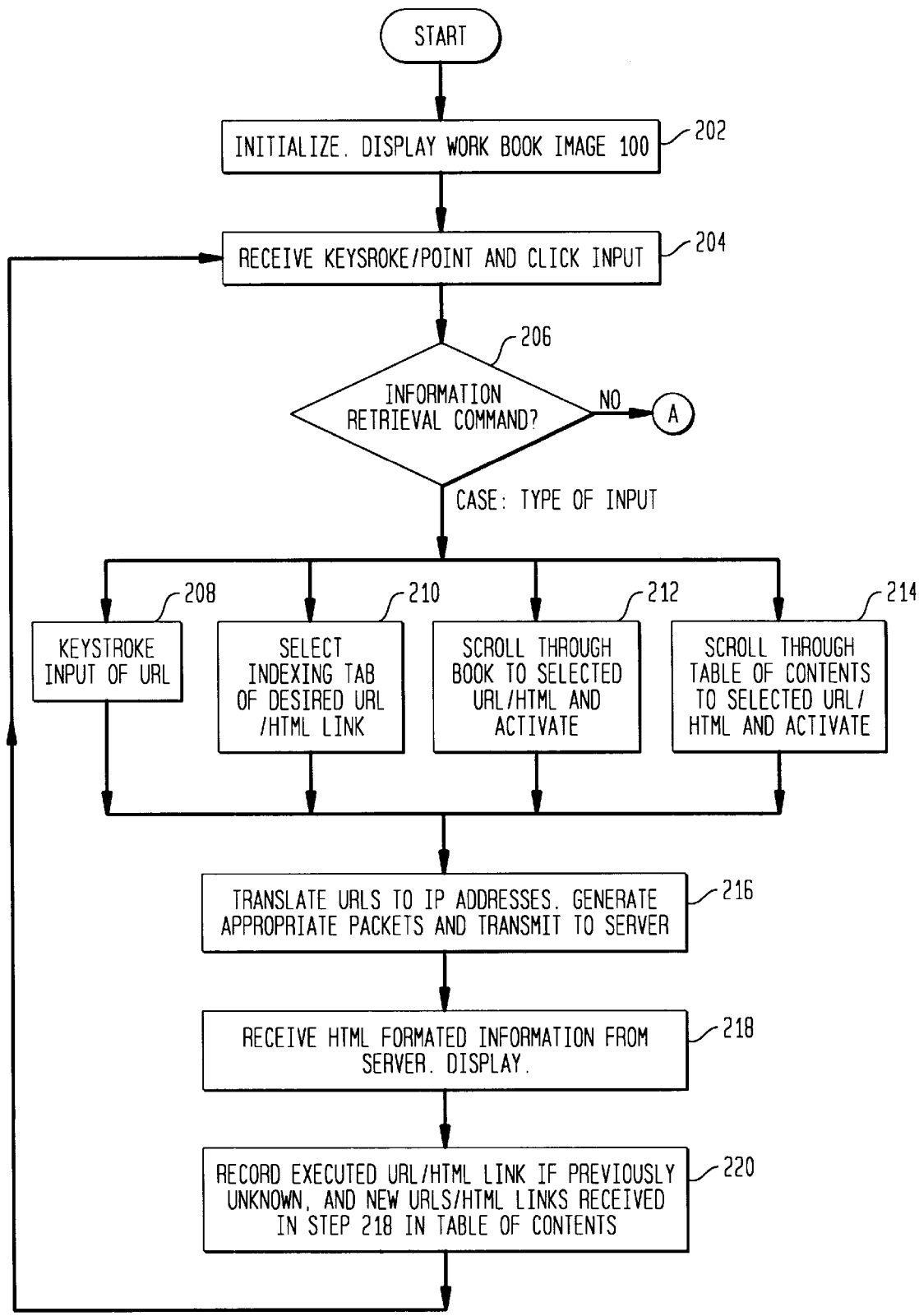
FIG. 9 shows a flow chart of a process executed by the present invention.

FIG. 9 shows a flow chart illustrating basic operation of the host 50, according to an embodiment of the present invention. In a step 202, the processor 51 initializes the host node 50, including loading certain information in the memory 52, initializing the I/O port 53 (and establishing a communication connection with an Internet access point, if necessary). The graphics controller 54 causes the display monitor 55 to display the Work book image 110 and bookshelf images 120 as shown in FIG. 6. In step 204, the user provides keystroke or point and click inputted commands using the (keyboard and/or pointer device of the) manual input device 56. Next in step 206, the processor 51 determines whether or not the inputted command provided by the user is for retrieving information, i.e., whether or not the user indicated a desire to execute a URL or HTML link. If not, the user may have provided an inputted command for displaying previously retrieved information or for re-organizing the URL/HTML link organization. The processor 51 would, in such a case, branch to steps generally referred to as "A".

Assume that the user did provide an information retrieval command. Such a command could have been provided in one of four different manners. As shown in step 208, the user could have simply typed in a URL to execute. For instance, the user positions the cursor of the pointing device over the input URL area 144, "clicks" a select button of the pointer device, types in the URL, positions the cursor of the pointer device on the Go button 145 and clicks the select button of the pointer device.

A second alternative shown in step 210 is where the user uses one of the displayed tabs 148 to execute its associated URL or HTML link. As noted above, each tab 148 is associated with information retrieved when a corresponding URL or HTML link was executed. The user can advance to the associated retrieved information by simply selecting the corresponding tab 148. For instance, the user positions the cursor of the pointing device over the desired tab 148 and clicks the select button of the pointer device. Thereafter, the user HTM re-execute the URL or HTML link. To that end, the user selects the Go button image 145 by positioning the pointer cursor over the Go button and clicking the select button of the pointer device.

A third alternative is depicted as step 212. In this alternative, the user scrolls through the URLs and HTML links displayed in the display area 150. As noted above, the user can use the scroll bar images 146 or backward and forward button images 131 to scroll through the different pages of information retrieved from the remotely accessible server nodes. The user can also select different ones of the tab images 148 to more rapidly advance through the retrieved information. Such retrieved information includes HTML (hypertext) links and URLs. When the desired URL or HTML link is displayed on the page, the user selects it using the pointer device. That is, the user moves the cursor of the pointer device over the desired URL or HTML link entry and clicks the select button of the pointer device. (A double click may be required, or the user can click once on the desired URL or HTML link entry to highlight the entry and then click the Go button icon 145 to select/execute the desired URL or HTML link.)

A fourth alternative is depicted as step 214. This alternative is similar to step 212, except the Table of Contents is used. As described below, the Table of Contents contains a hierarchical history of all of the URL and HTML link entries executed or retrieved. Advantageously, only URLs and HTML links on the highest level of the hierarchy are initially displayed in the Table of Contents. The links on the lower level of the hierarchy can be systematically displayed by moving the cursor of the pointing device over a particular entry of the Table of Contents and double clicking the select button of the pointer device. In response, the display monitor 55 shows the URLs and HTML links of the next level of the hierarchy below the particular entry. This is illustrated in FIG. 10, which shows the image 100' displayed on the display screen of the display monitor when the Table of Contents tab image is selected. As shown in the title bar 130', the Library book 121 has been selected (Note also the change in iconic image of the Library icon 121' in the book shelf 120'. Also shown are the date 151 and clock 152 images instead of the connection indication 141, gauges 142 stop button image 143 and Go button image 145. The images 141, 142, 143 and 145 are not displayed. This is because such information is presumed to be unnecessary. The images 141, 142, 143 and 145 pertain to conducting a communication, whereas the Table of Contents pertains to reviewing previously retrieved information.)

In the display area 150' of the book image 110', three entries of the highest level are shown, namely, 161, 162 and 163. Each of these entries is associated with a different URL. The URL entry 162 is associated with gopher URL entry 171, news group URL entries 172 and 173 and HTML links entries 174 and 175. Note that different icons are used for general log in URLs, gopher URLs, news group URLs and HTML links so as to distinguish them. Also associated with the URL entry 162 are URL entries 176 and 177. As described in greater detail below, when the URL of the entry 162 was originally executed, the contacted server returned the gopher URL of the entry 171, the news group URLs of the entries 172 and 173, the HTML links of the entries 174 and 175 and the URLs of the entries 176 and 177. Since each of the entries 171–177 was generated from information provided from the access server in response to executing the URL of the entry 162, the entries 171–177 are shown indented one tab stop to indicate that they are on a second lower level of the hierarchy. Furthermore, these entries 171–177 are listed below the entry 162 to show that they are associated with the URL entry 162.

Associated with the HTML link 175 is the URL entry 181. Illustratively, when the HTML link was executed, the server returned the URL of the entry 181. Thus, this URL entry 181 is shown indented two tab stops to indicate that it is on a level in the hierarchy below the HTML link of the entry 175. The URL entry 181 is furthermore listed below the HTML link entry 175 to show that it is associated therewith. Likewise, when the URL of the entry 181 was executed, the accessed server returned the HTML links associated with the entries 182 and 183. These are shown indented three tab stops to indicate that they are on a level of the hierarchy lower than the URL associated with the entry 181. These entries 181 and 183 are also shown listed below the URL entry 181.

Given the hierarchical listing shown in FIG. 10, the user can discern the hierarchical organization/presentation of information at the server nodes. For instance, the user can discern that the HTML link of the entry 182 was discovered by executing the URL of the entry 162 (which caused the HTML link of entry 175 to be retrieved from a server), executing the HTML link of the entry 175 (which caused the URL of entry 181 to be retrieved from a server), and then executing the URL of the entry 181. This can help the user determine how information was ascertained and also the hierarchical organization of the retrieval of information at various server nodes. Furthermore, if the user is interested in examining previously retrieved information, the user can quickly identify the information due to the hierarchical organization of the Table of Contents. Thus, the user can quickly select to the appropriate page on which such retrieved information is displayed.

Returning to the discussion of FIG. 9 step 214, when the user selects the Table of Contents tab, the display monitor 55 initially only displays the entries 161, 162 and 163 in the display area 150'. In response to the user selecting the entry 162, the display monitor 55 then additionally displays the entries 171–177. In response to the user selecting the entry 175, the display monitor 55 then additionally displays the entry 181. In response to the user selecting the entry 181, the display monitor 55 then additionally displays the entries 182 and 183. When the user has located the desired URL or HTML to execute, the user causes the URL or HTML link to be executed by simply selecting the appropriate entry and selecting an Execute command from the Option drop down menu 153' using the pointer device.

Next, in step 206, the processor 51 translates the selected URLs or HTML links. In particular, the execution of HTML links may require the execution of an appropriate URL to contact the appropriate server and then the transmission of corresponding commands as per a script associated with the selected HTML link. Furthermore, each URL must be translated to its corresponding IP address. If such URL to IP address translation information is locally maintained in the memory 52, then the processor 51 performs the translation. Otherwise, the processor 51 may first have to generate a packet for transmission to the domain name server of the host node 50 to obtain the requisite translation. After generating the appropriate one or more packets for executing the selected URL or HTML link, the processor 51 transfers the one or more packets to the I/O port 53 and causes the I/O port 53 to transmit the packets via the WAN.

The one or more packets propagate on a backbone network of the WAN, the routers of the WAN use the IP address of the packets to route them. The one or more packets eventually arrive at the server node to which they are destined. the server node responds by transmitting one or more packets back to the host 50 via the WAN.

The packets transmitted by the server node propagate on the WAN until they arrive at the I/O port 53. Illustratively, the transmitted packets include HTML formatted information. In step 218, the processor 51 extracts from the received packets the retrieved information and interprets the retrieved information. This information may be organized and stored in the memory 52 pending display. In particular, the URLs, and HTML links, may be recorded/stored in the memory 52 in a hierarchical fashion and their associated scripts and address translation may also be recorded/stored in the memory 52. The processor 51, in conjunction with the graphics controller 54, display the information on the display monitor 55. Such information is displayed in the display area 150 (FIGS. 6 and 7) in a scroll-able fashion. Executable URLs and HTML links are also identified and shown in a highlighted fashion in the display area 150 so as to cue the user as to their executability.

Next, in step 220, the processor 51 examines the Table of Contents to determine if any of the retrieved URLs or HTML links in the information received in step 218 is new or supersedes existing information. If the information is already accurately reflected in the Table of Contents, the processor 51 merely updates the date and time of receipt of such information (which date and time of receipt information is shown in FIG. 10). Furthermore, if necessary, the processor 51 updates the page number information which locates the retrieved information (in the case that it changes).

If new URLs and/or HTML link information is retrieved, then the processor 51 adds entries to the Table of Contents corresponding to such information. Entries are added in a hierarchical fashion and associated with the URL or HTML link that was executed to retrieve such new URLs or HTML links. This is illustrated in FIG. 11. Prior to executing the HTML link of entry 183, no entries can be displayed below the entry 183 in the display area 150' of the Table of Contents. Execution of the HTML link of the entry 183 causes a server node to return (among other things), a new URL and a new HTML link. The processor 51 illustratively generates one entry 184 for the new URL and one entry 185 for the new HTML link. If the Table of Contents were then displayed, the new entries 184 and 185 could be displayed immediately below the entry 183 in the display area 150". These entries 184 and 185 are indented four tab stops to indicate that they are one hierarchical level below the entry 183.

After executing step 220, execution returns to step 204. Once again, the processor 51 is available to receive inputted commands and process them.

Note that in addition to the above noted URL and HTML links, the retrieved information can also include more basic hypertext links. For instance, suppose the retrieved information is lengthy including several pages of information. Occasionally, hypertext links are provided which merely advance the display of information within the currently retrieved text—i.e., when selected, the display of information "jumps" to a different starting point within the retrieved information. Such hypertext links can be accommodated in a number of ways. For example, if the hypertext link advances the user onto a different page of displayed information (than the page on which the selectable text of the hypertext link appears), such a hypertext link is recorded in the Table of Contents. Otherwise, the hypertext link is not recorded as it does not provide a substantial indexing capability. In determining whether or not the hypertext link is to be recorded, the processor 51 examines the hypertext link including the location of the selectable text and the location of the "jump point" to which the display advances in response to selecting the hypertext link. Based on the relative distance (in terms of occupancy of the display screen area), the processor 51 determines whether or not to record the hypertext link as an HTML link.

DISPLAY OF INFORMATION

In addition to transmitting packets that request retrieval of information, the invention can be used to simply display previously retrieved information. For instance, the user can select a tab image 148 without selecting the Go button image 145. This causes the processor 51 and graphics controller 54 to simply display the first page of information retrieved by executing the URL or HTML link associated with the selected tab image. Alternatively, the user can first select the Table of Contents tab image 148. The user can scroll through the hierarchical list of URL and HTML link entries. Using the pointer device, the user selects one of the entries. Then, the user selects the Goto command from the View drop down menu 155' (See FIG. 10). Again, this causes the processor 51 and graphics controller 54 to display the first page of information retrieved by executing the URL or HTML link associated with the selected entry. Once the user has displayed the first page of information, the user can scroll through the information using the scroll bars 146 and backward and forward button images 131.

MODIFICATION OF ORGANIZATION

As noted above, the processor 51 may receive commands other than information retrieval commands. For instance, the processor 51 can receive commands for editing the organization of entries and/or retrieved information. Examples of such commands are commands to delete entries corresponding to selected URLs or HTML links. This results in deleting any information that was retrieved when the to-be-deleted URL or HTML links were executed. Such a delete command may be achieved using the pointer device. For example, consider the table of contents in FIG. 9. If the user desires to delete the entries 181–183, and their associated text, the user first positions the pointer device cursor on the entry 181. While pressing and holding the select button of the pointer device, the user moves the pointer device cursor over the entry 183. This causes the entries 181–183 to be selected. The user then selects the delete command from the Edit drop down menu 154'. In response, the processor 51 erases the URLs and HTML links (including IP address translations and scripts) corresponding to the entries 181–183 and any information retrieved while executing these URLs and HTML links.

Alternatively, the user can simply "cut and paste" entries within an organization corresponding to a given book, or move entries and associated retrieved information between URL/HTML link organizations corresponding to different books. For instance, suppose that after selecting the entries 181–183, the user simply selected the Cut command from the Edit drop down menu 154'. The user could then position the pointer device cursor at a new desired location within the Table of Contents. The user then selects the Paste command from the Edit drop down menu 154'. The selected entries 181–183 are moved from their original location to the new desired location. The associated information retrieved when executing these entries is then accordingly placed at new page numbers corresponding to the new location of the entries 181–183 in the Table of Contents (i.e., before the information of the entry that succeeds the entry 183 in the new location and after the information that precedes the entry 181 in the new location.) Note that the user can even change the hierarchical levels of the entries in this fashion.

If after entries 181–183 are selected, a different book icon is selected, e.g., the book icon Travel 122, then the entries 181–183 and associated information can be moved to the URL/HTML link organization associated with the book icon Travel 122. To that end, after selecting the Travel book icon 122, the user selects the Table of Contents tab image. The user then scrolls through the Table of Contents, moves the pointer cursor to the desired location, and selects Paste from the Edit drop down menu 154'.

HIERARCHICAL RECORDING/DISPLAYING FILTERING

When information is retrieved from a server node, the information is recorded/stored in memory 52 for later display. As noted above, the Table of Contents of the URL/HTML link organization provided a manner for indexing the information. Illustratively, the manner of organizing/associating retrieved information may be user defined. Specifically, a "filter" is provided for the URL/HTML link organization corresponding to each book icon 121–125. Each filter is a list of pattern matching terms called reference terms. Each time information is retrieved from a server node, the processor 51 compares the text of headings or titles in the retrieved information to the list of reference terms of the filter of each URL/HTML link organization. If the retrieved headings information contains text that matches any one of the reference terms of a filter, then the processor 51 records the information in the URL/HTML link organization corresponding to the book icon 121–125 with which the filter is associated. Each time information is recorded or stored in a particular URL/HTML link organization, the processor 51 hierarchically modifies the Table of Contents (in which the URLs and HTML links are hierarchically organized) of that URL/HTML link organization in accordance with the above noted steps. Note that the processor 51 may record the retrieved information so that it is associated with more than one URL/HTML link organization. Nevertheless, the processor 51 illustratively stores the information only once in the memory 52. To enable multiple URL/HTML link organization recording, the processor illustratively, generates and stores pointers to the stored information and associates such pointers with each URL/HTML link organization into which the retrieved information is to be recorded. In the event that no filter has terms that match the headings of the retrieved information, the processor 51 records the retrieved information in the currently opened URL/HTML link organization.

Figure 12:
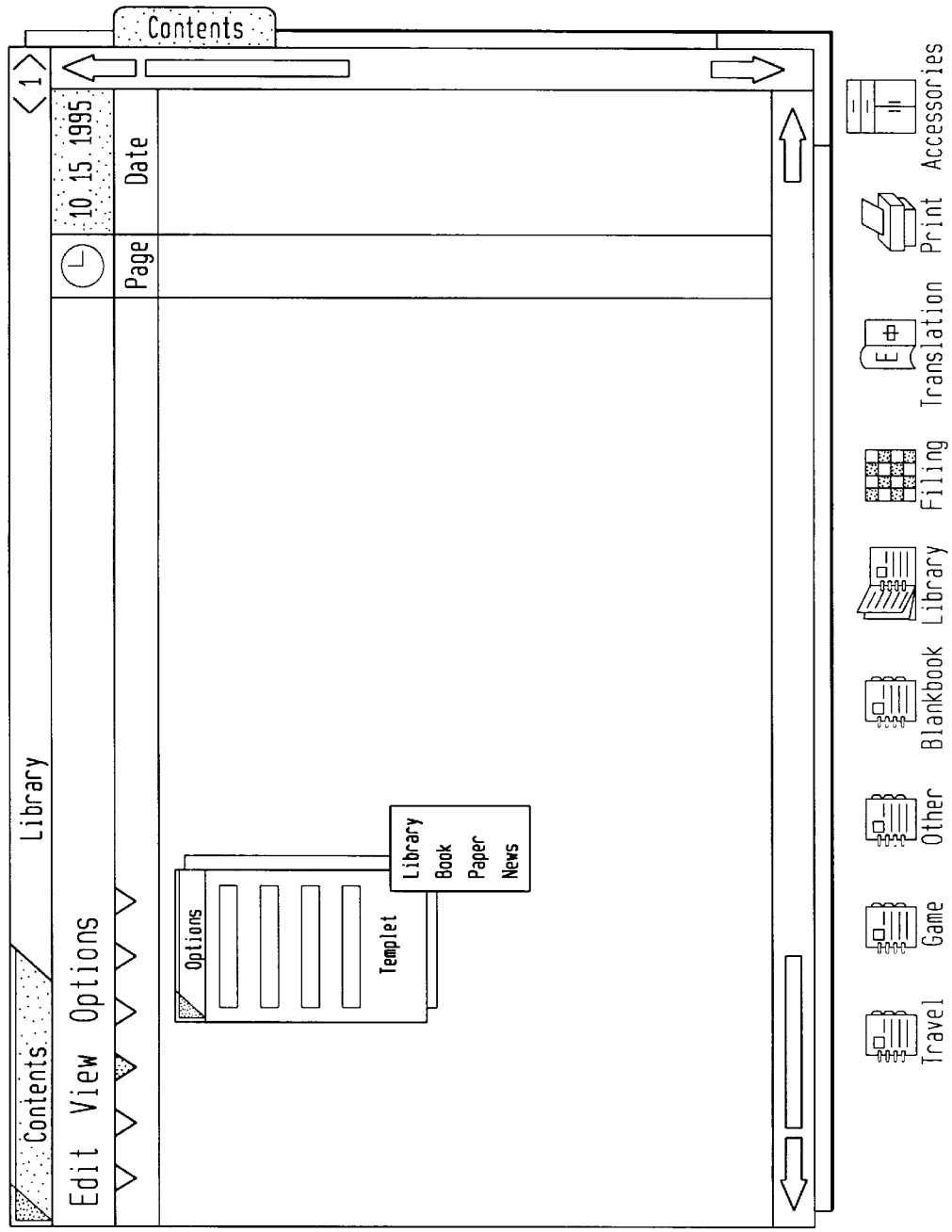
FIG. 12 shows an image displayed when modifying a filter template for a URL/HTML link organization according to an embodiment of the present invention.

The filters are used as follows. The user selects the book icon 121–125 of the URL/HTML link organization for which the filter is to be modified. Using the pointer device, the user selects the filing icon 128. Alternatively, while viewing the Table of Contents of the selected URL/HTML link organization, the user can select the Template command from the Option drop down menu (with use of the pointing device). This is illustrated in FIG. 12. When the Template command is selected, a second extended pop-up menu appears with different filterable choices, e.g., "Library", "Book", "Paper", "News", etc. The user then selects book for altering the list of reference terms used in the pattern matching for the currently opened book. Illustratively, the processor 51 provides the title associated with each URL/HTML link organization as a default pattern matching reference term (i.e., by default, the Library Book organization, has the reference term "library", the Travel Book organization has the reference term "travel", etc.) The user can enter alternate and additional reference terms to the filter template. The user then saves the modifications to the filter template.

Note the advantages that this provides to the user. First, the user need not actively cut, copy or paste retrieved information so as to organize it into the appropriate URL/HTML link organization associated with the appropriate book icon. Rather, the filter template and a filtering feature automatically causes the processor 51 to perform such organization. Second, the filter templates are saved in the memory 52 between sessions. Therefore, the user need not devise a filtering strategy, nor enter filter template terms between sessions for use in organizing the recording of retrieved information. Third, the reference terms used as a basis for performing the pattern matching may be modified according to the user's needs and design so as to more accurately sort the information into the appropriate URL/HTML link organization.

CONCLUSION

In short, an organization for URLs and HTML links is disclosed for a host node having an I/O port and a display monitor. The I/O port transmits packets to a specific one of the remotely accessible server nodes containing a request for information. In response, the I/O port receives packets containing requested information, entries describing other topics of information that can be provided from the specific server node and entries describing other server nodes. The display monitor has a view area on which images are displayed. The display monitor displays a hierarchically organized table. The table includes the entries describing remotely accessible server nodes and the entries describing topics of information that can be retrieved from the remotely accessible server nodes. The entries are hierarchically organized so as to indicate a hierarchical organization of the entries as provided for retrieval from the remotely accessible server nodes which hierarchical order of retrieval is independent of a specific order of retrieval by the host node.

The invention achieves the following aspects:

(1) Entries describing URLs and HTML links that are executed or returned in information packets from remotely accessible server nodes are recorded independently of the order in which they are executed. Rather, the entries are hierarchically organized depending on the URL or HTML link that causes such additional URLs or HTML links to be discovered.

(2) The hierarchical recording of URLs and HTML link entries in the Table of Contents provides an index for located associated retrieved information quickly. Such information can be easily re-arranged to suit the user's needs.

Finally, the above-discussion is intended to be merely illustrative of the invention. Numerous alternative embodiments may be devised by those having ordinary skill in the art without departing from the spirit and scope of the following claims.

The invention claimed is:

1. A host node in an Internet or wide area communications network that can communicate packets with one or more remotely accessible server nodes via a backbone network, said host node comprising:

an I/O port coupled to said host node which transmits, via said backbone network, request packets to specific ones of said remotely accessible server nodes containing a plurality of requests for information, and which receives in response to each request of said request packets, via said backbone network, from said respective specific ones of said remotely accessible server nodes, response packets containing said requested information, entries describing other topics of information that can be retrieved from said specific server nodes and entries describing other server nodes, a processor coupled to said I/O port for receiving said entries and for generating a hierarchically organized table including said entries, said hierarchically organized table including said entries received in response to each of said requests describing remotely accessible server nodes and said entries received in response to each of said requests describing topics of information that can be retrieved from said remotely accessible server nodes, a memory coupled to said processor for storing said hierarchically organized table generated by said processor, and a display monitor coupled to a said memory for selectively displaying said requested information received in response to a most recently issued request or said hierarchically organized table stored in said memory including each of said entries received in response to each of said requests hierarchically organized so as to indicate a hierarchical organization of said entries as provided for retrieval at said remotely accessible server nodes, said hierarchical organization of said displayed table of entries being independent of a specific order of issuance of said requests or receipt of requested information in response to said requests.

2. The host node of claim 1 wherein information retrieved from packets transmitted from one of said remotely accessible nodes includes information that is displayable on said display monitor, said displayable information including one or more displayable and selectable topics, said retrieved information also including instructions associated with each of said selectable topics, wherein in response to selecting one of said selectable topics, said I/O port, in accordance with said instructions corresponding to said selected topic, transmits a request packet containing a request to retrieve said information of said selected topic to one of said remotely accessible server nodes, wherein said display monitor displays a first table entry describing said retrieved information as a table entry of a first level of said hierarchy, and said display monitor displays a list of table entries, as a second level of said hierarchy lower than said first level of said hierarchy, immediately below said first table entry, said list of table entries including a separate table entry for each of said selectable topics contained in said retrieved information.

3. The host node of claim 1 further comprising:

a manual input device, for selectively scrolling through said hierarchical table of entries displayed on said display monitor, and for selecting one of said entries, wherein said display monitor, said manual input device and said communications port cooperate so as to transmit at least one packet requesting information to a remotely accessible server node corresponding to said selected entry.

4. The host node of claim 1 wherein said display monitor displays, in an area of said screen a selectable icon for stopping packet communication with the remotely accessible server node with which said communications port currently communicates.

5. The host node of claim 1 wherein said entries of said table are selectably reorganize-able so as to modify said hierarchical organization of said table.

6. The host node of claim 1 wherein said display monitor displays at least one icon corresponding to an additional hierarchically organized table, wherein, in response to selecting said at least one icon said display monitor displays a portion of said entries of said additional hierarchically organized table corresponding to said selected icon in an area of said display screen.

7. The host node of claim 1 wherein at least one of said entries indexes information retrieved from one of said remotely accessible server nodes corresponding to said entry.

8. The host node of claim 1 wherein said display monitor displays a portion of entries of said table in a first area of a screen of said display monitor, said particular portion of entries being scroll-able, and wherein said display monitor displays, in a second different area of said screen, one or more tab images, each associated with one of said entries, that can be selected regardless of whether or not said entries associated with said tab images are also displayed on said first area of said screen.

9. The host node of claim 1 wherein in response to selecting one of said entries, said display monitor displays information retrieved from a server node, or information pertaining to a topic, described by one of said entries.

10. The host node of claim 1 further comprising:
  a processor which pattern matches retrieved information to a list of patterns of a filter template provided for each of said organizations of information and which organizes said retrieved information into each organization having a filter template that contains a pattern with which said retrieved information matches.

11. An Internet or wide area communications network comprising:
  a plurality of nodes, including a local host node and a plurality of remotely accessible server nodes, and
  a backbone network, interconnecting said plurality of nodes for receiving a packet originating from one of said nodes and transmitting said packet to another one of said nodes which terminates said packet,
  said host node comprising:
    an I/O port coupled to said host node which transmits, via said backbone network, request packets to specific ones of said remotely accessible server nodes containing a plurality of requests for information, and which receives in response to each request of said request packets, via said backbone network, from said respective specific ones of said remotely accessible server nodes, response packets containing said requested information, entries describing other topics of information that can be retrieved from said specific server nodes and entries describing other server nodes,
    a processor coupled to said I/O port for receiving said entries and for generating a hierarchically organized table including said entries, said hierarchically organized table including said entries received in response to each of said requests describing remotely accessible server nodes and said entries received in response to each of said requests describing topics of information that can be retrieved from said remotely accessible server nodes,
    a memory coupled to said processor for storing said hierarchically organized tale generated b said processor, and
    a display monitor coupled to a said memory for selectively displaying said requested information received in response to a most recently issued request or said hierarchically organized table stored in said memory including each of said entries received in response to each of said requests hierarchically organized so as to indicate a hierarchical organization of said entries as provided for retrieval at said remotely accessible server nodes, said hierarchical organization of said displayed table of entries being independent of a specific order of issuance of said requests or receipt of requested information in response to said requests.

12. In an Internet or wide are a communications network comprising a plurality of server nodes and a host node that can communicate packets with one or more of said remotely accessible server nodes via a backbone network, said host node comprising:
  transmitting, from an I/O port coupled to said host node, via said backbone network, request packets to specific ones of said remotely accessible server nodes containing a plurality of requests for information,
  receiving at said I/O port of said host node in response to each request of said request packets, via said backbone network, from said respective specific ones of said remotely accessible server nodes, response packets containing said requested information, entries describing other topics of information that can be retrieved from said specific server nodes and entries describing other server nodes,
  receiving said entries and generating a hierarchically organized table including said entries by a processor that is coupled to said I/O port, said hierarchically organized table including said entries received in response to each of said requests describing remotely accessible server nodes and said entries received in response to each of said requests describing topics of information that can be retrieved from said remotely accessible server nodes,
  storing said hierarchically organized table generated by said processor in a memory that is coupled to said processor, and
  selectively displaying on a display monitor, coupled to said memory, of said host node said requested information received in response to a most recently issued request or said hierarchically organized table stored in said memory including each of said entries received in response to each of said requests hierarchically organized so as to indicate a hierarchical organization of said entries as provided for retrieval at said remotely accessible server nodes, said hierarchical organization of said displayed table of entries being independent of a specific order of issuance of said requests or receipt of requested information in response to said requests.

* * * * *